Dec. 25, 1962 F. H. DILL 3,070,708

LOGICAL CIRCUITS

Filed Dec. 30, 1959

INVENTOR
FREDERICK H. DILL

BY *Alvin J. Riddles*
ATTORNEY

United States Patent Office 3,070,708

Patented Dec. 25, 1962

3,070,708

LOGICAL CIRCUITS

Frederick H. Dill, Pleasant Valley, N.Y., assignor to International Business Machines Corporation, New York, N.Y., a corporation of New York Filed Dec. 30, 1959, Ser. No. 862,983
15 Claims. (Cl. 307—88)

The invention relates to logical operations in digital computers and in particular to logical operations performed with magnetic cores.

In the development of logical circuits for digital computers, the magnetic core having an essentially rectangular hysteresis loop has been employed to advantage as a storage element since no power is required to retain in the material the stored information. However, the use of magnetic cores has been accompanied by one serious difficulty in that in instances where the magnetic core requires resetting, the use of clock timed reset pulses has been required and these clock timed pulses place a rate requirement on the logic system which slows down the operation of any logical computations taking place therein.

A desirable logical system is one in which the speed of a logical computation is limited only by the switching speed of the components without having to wait for timed pulses. Such a system is known in the art as an asynchronous system.

What has been discovered is a technique of performing logic using magnetic cores having essentially rectangular hysteresis loops wherein a semiconductor device known in the art as the "Esaki" or "tunnel" diode is employed to provide for both driving and resetting operations of the magnetic core and thereby eliminate the need for clock timed reset pulses. This technique when applied in logic systems permits asynchronous operation.

It is an object of this invention to provide an improved asynchronous logic system.

It is another object of this invention to provide a circuit for the transfer of logical information to and from a magnetic core without the use of timed reset pulses.

It is another object of this invention to provide a means for reducing the current requirement in resetting a magnetic core in a circuit.

It is another object of this invention to provide a magnetic storage circuit employing an "Esaki" or "tunnel" diode in the resetting operation.

The foregoing and other objects, features and advantages of the invention will be apparent from the following more particular description of a preferred embodiment of the invention as illustrated in the accompanying drawings.

The logical circuit of the invention employs two types of circuit elements in cooperative relationship which provide a magnetic core logic type circuit with an automatic reset so that it is possible to proceed through a plurality of logical steps without having to provide a clock timed reset pulse at each step. The first type of circuit element in the logical circuit of this invention is the magnetic core which may be of the type with a rectangular hysteresis loop well-known in the art and the second type of circuit element is the current driven negative resistance semiconductor device known in the art as the "Esaki" or "tunnel" diode.

Figure 1:
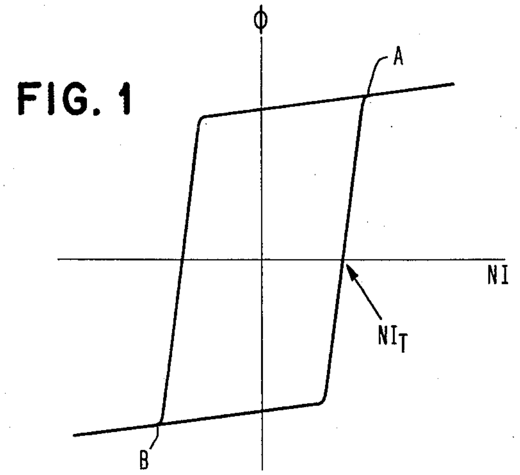
FIG. 1 is a sketch of a rectangular hysteresis loop of a magnetic element usable in the circuit of the invention.

The first element exhibits a hysteresis loop and where the loop is rectangular the loop is described in connection with FIG. 1. Referring to FIG. 1, a rectangular hysteresis loop characteristic of atypical square loop magnetic core usable in connection with the invention is shown. The characteristic of FIG. 1 is a graph with flux plotted as the ordinate and the product of the current and the number of turns plotted as the abscissa. In the characteristic of FIG. 1, when a threshold current required for switching, labelled $NI_T$ is applied, the switching of the magnetic core will be carried to completion and the state of the core will come to reset at a point of remanence labelled A. Similarly, a reverse current of threshold value applied to the core will be sufficient to change the state of the core to the opposite remanent position labelled B. Where the magnetic core is not of square loop material there is no definite threshold voltage or remanence states. The current applied merely drives the device to saturation.

Figure 2:
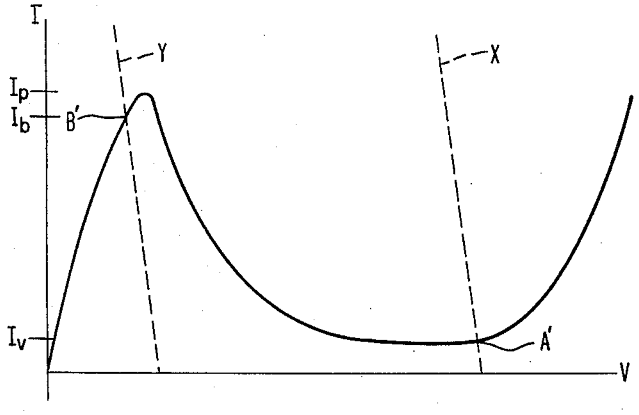
FIG. 2 is a sketch of the output potential current characteristic of the "Esaki" or "tunnel" diode used in connection with the invention with load lines shown for the various "Esaki" or tunnel" diodes employed.

Referring next to FIG. 2, the second type of circuit element employed in the circuit of the invention, the "Esaki" or "tunnel" diode is described. This circuit element is a semiconductor device having a region of degenerate semiconductor material of one extrinsic conductivity type joining a second region of degenerate semiconductor material of the opposite extrinsic conductivity type at a p-n junction. The degeneracy in the semiconductor material is produced by introducing conductivity type determining impurities into monocrystalline semiconductor material in a sufficiently high concentration that the "Fermi" energy level for the material lies within the valence or conduction bands for the material in the corresponding extrinsic conductivity type zones. This type of structure in circuit applications exhibits a quantum mechanical tunneling effect, wherein carriers tunnel through from the valence band on one side of the junction to the conduction band on the other with the application of a voltage less than the forbidden gap region of the semiconductor material. This quantum mechanical tunneling effect was first observed and reported by Leo Esaki in the Physical Review, January 1958, pages 603 and 604, and semiconductor devices exhibiting this phenomenon have come to be known in the art as the "Esaki" or "tunnel" diodes.

Referring to FIG. 2, the output characteristic of a typical "Esaki" or "tunnel" diode is plotted. The applied potential is plotted as the abscissa and the current as the ordinate. In the characteristic of FIG. 2, as may be seen from the curve, as the voltage is applied, there is an initial sharp increase of current to a turnover point labelled $I_p$, this point is known in the art as the "peak" current for the device. This portion of the curve is determined by the quantity of quantum mechanical tunneling that takes place within the device. At the point $I_p$, the potential applied across the device operates to change the bias on the extrinsic conductivity type regions and thereby to widen the forbidden region. This change of bias is manifested in the output characteristic as a decrease in current and thus a region of negative resistance is seen with the current falling to a value labelled $I_v$, this point is known in the art as the "valley" current of the device. As may be seen from the curve of FIG. 2, the magnitude of the "valley" current is considerably less than that of the "peak" current. For values of potential beyond the valley current, there is general rise in current with applied voltage. The "peak" and "valley" points in the output characteristic may be referred to as the critical points in the output characteristic of the device. The "Esaki" or "tunnel" diode exhibits its region of negative resistance in the forward direction at potential values less than that required to apply a field sufficient to impart energy to a carrier to advance it from the valence to the conduction band of the semiconductor material. This semiconductor device in addition to its negative resistance forward characteristic, due to the high concentration of conductivity type determining impurities in the material from which it fabricated has a very low resistance in the reverse direction. Two static load lines $x$ and $y$ for the "Esaki" or "tunnel" diode device have been shown in the curve of FIG. 2 for explanation purposes in connection with the circuit of FIGS. 3 and 4 to be later discussed.

The circuit of the invention is illustrated in connection with FIG. 3 wherein a magnetic core 1, which may have a rectangular hysteresis loop is provided with three windings 2, 3, and 4 respectively. The winding 2 is connected in a series loop including a battery 5, an impedance 6 and an "Esaki" or "tunnel" diode 7 along with an inductive input element 8 having a negligible resistive impedance such as a pulse transformer having an input winding 9 for signal introduction purposes. An output winding is provided on the core 1 and is available at terminals 10 and 11 for signal sensing purposes known in the art. A reset winding 4 is provided on the core 1 and is poled in the direction for resetting the core. The reset winding 4 is connected in a series circuit involving a battery 12, and an impedance 13.

The operation is as follows. The source of potential 5 and the impedance 6 operate to provide a load line for the "Esaki" or "tunnel" diode 7 as shown in FIG. 2 as the dotted line labelled Y, wherein the "Esaki" or "tunnel" diode 7 is biased to a stable portion of its high conduction state. This may be seen by the fact that the dotted load line Y of FIG. 2 crosses the output charateristic in the region of the "peak" current labelled $I_p$ at an operating point labelled $I_b$. Under these conditions, referring to FIGS. 1, 2, and 3 in the portion of the circuit involving element 7, the normal current flowing through the "Esaki" or "tunnel" diode corresponding to the current value of point B′ in FIG. 2 normally keeps the core in its reset state. In order to do this, the magnitude of the normal current $I_b$ and operating point B′ in FIG. 2 are adjusted by means of the potential 5 and resistance 6 such that $I_b$ is greater than $I_t$ in FIG. 1 plus the bias current $I_0$ whose magnetizing effect in the core it must overcome. Where a magnetic element 1 not having a square loop is employed, a current sufficient to hold it in saturation is used in place of $I_t$. Under these conditions whenever the circuit does not operate, $I_0$ will reset the core to point B in FIG. 1 and keep it reset.

Figures 3, 4:
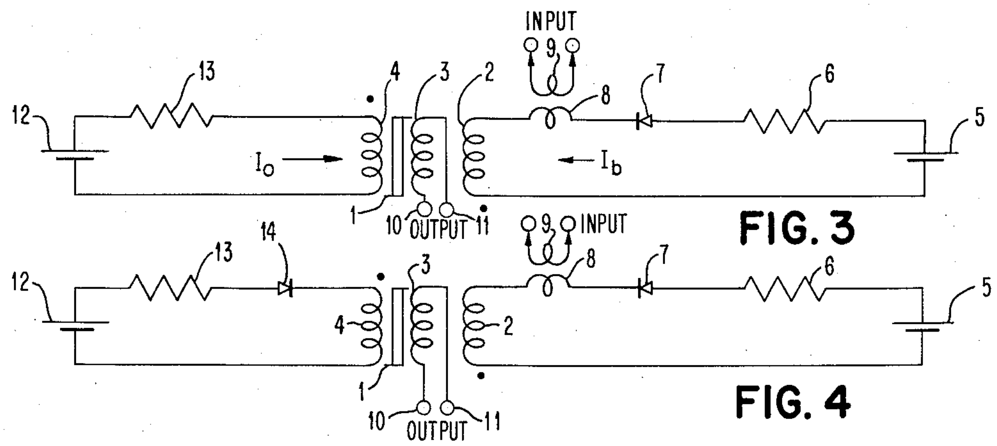
FIG. 3 is one embodiment of the circuit of the invention.
FIG. 4 is another embodiment of the circuit of the invention.

When an input signal appears, preferably of short duration, applied through input winding 9 on the transformer 8, the applied potential is momentarily increased on element 7 which moves the operating point in FIG. 3 to the high voltage branch of the characteristic curve to operating point A′ of the FIG. 2. This causes the current in the "Esaki" or "tunnel" diode 7 to fall toward $I_v$. The circuit is so constructed that the bias current is greater than the valley current $I_v$ by an amount more than $I_t$ of a square loop core or the saturation current of a core not having a square loop. When the current through element 7 falls to the point where the difference between $I_0$ and the current through element 7 is just $I_t$ or the saturation current of a non square loop core, this is the current necessary to change the remanent state of the core 1 so that the core I will be switched by the net current flowing through windings 2 and 4. The output occurs during the switching process and is sensed through winding 3 at output terminals 10 and 11. When the core 1 is completely switched, the current in the core 1 and in the "Esaki" or "tunnel" diode 7 can decrease through the value $I_v$ in FIG. 2, shift to the low voltage branch of the characteristic and start increasing towards point B′. When the current through element 7 rises to a value such that this current is equal to $I_0$, the current flowing through winding 4, plus $I_t$, the current necessary to change the remanent state of core 1, the core is reset by the net current flowing through windings 2 and 4 of FIG. 3. After the core has been reset, the current through element 7 rises and comes to rest at stable operating point B′ where it remains until the next input pulse.

It will be apparent to one skilled in the art that there will be a difference of speed between reset and set due to the smaller available voltage during reset operations of the circuit of the invention.

It will also be apparent that the circuit can be constructed to operate with different current relations by varying the numbers of turns in any or all of the windings, further with suitable changes of bias the circuit can be made to switch around the valley point, rather than the peak point of the characteristic of FIG. 2.

The resetting operation may be performed in accordance with the invention by providing a second "Esaki" or "tunnel" diode for use in the circuit to provide reset as shown in FIG. 4. In FIG. 4, corresponding elements bear like reference numerals and the diode that resets the core is labelled element 14 and which is normally biased at point B′ of FIG. 2 by a load line Y of FIG. 2. The diode 7 that sets the core under the conditions of FIG. 4 is held in the low conducting state at point A′ by load line X of FIG. 2. The operation of the circuit of FIG. 4 is similar to that of FIG. 3 except that the peak current of the "Esaki" diodes are reduced by approximately half.

It is pointed out that two threshold values exist in this circuit which enables it to be used to perform logic. The first of these is the threshold current for the magnetic core $I_t$ or the saturation current for a non square loop magnetic element. The second is the minimum threshold for the input signal to cause the core to be switched and then reset. By suitable use of these thresholds with simultaneous inputs it is possible to obtain AND symbolized "●", OR symbolized "∨", NOT symbolized "‾", functions well known in the art and usable for logical purposes. For example the logical expression $A \bullet B$ may be achieved by simultaneously applying the variables A and B each in the form of a pulse through elements such as 8 the sum of which pulses provides a threshold for an "Esaki" diode or in the alternative two input loops may be provided in the current in combination during signal time adds up to the threshold of the magnetic element.

Similarly, for the logical expression $A \vee B$ each pulse would be of a magnitude sufficient to provide the threshold. The logical $\bar{A}$ would be achieved by assigning a synchronized fixed signal of one polarity to one element such as 8 and introducing the variable A with reverse winding polarity to another element such as 8 so that in the absence of A the fixed signal will switch the magnetic element. This arrangement is truth functionally equivalent to $B \bullet \bar{A}$.

In order to aid in understanding and practicing the invention and to provide a starting place for one skilled in the art in the fabrication of the circuit of the invention, the following set of specifications for the circuit of FIG. 3 is provided, it being understood that no limitation be construed hereby for in the light of the above description of the invention many such sets of particular specifications may be devised by one skilled in the art.

| | |
|---|---|
| Magnetic core 1 | $I_t$=0.5 ampere turn. |
| Battery 5 | 0.1 volt. |
| Bias current $I_0 \rightarrow I_t + I_v$=0.62 ampere | |
| Impedance 6 | 0.1 ohm. |
| Tunnel diode 7 | $I_p$=1.2 amperes; $I_b$=1.12 amperes; $I_v$=0.12 ampere. |

What has been described is the use of the negative resistance characteristic of the "Esaki" or "tunnel" diode in combination with the hysteresis loop of a magnetic element in a logical type of circuit wherein the circuit has an input loop and a reset loop and an internal current relationship such that input pulses singly or in combination operate to change current state of the "Esaki" or "tunnel" diode in the input loop and the reset loop at the end of pulse duration operates to return the magnetic element to its original condition.

While the invention has been particularly shown and described with reference to a preferred embodiment thereof, it will be understood by those skilled in the art that various changes in form and details may be made therein without departing from the spirit and scope of the invention.

What is claimed is:

1. A logical circuit comprising a magnetic element exhibiting hysteresis biased to saturation, a source of current, an impedance, an "Esaki" diode operable in one of two conductivity states, means connecting said current source, said "Esaki" diode, said magnetic element, and said impedance in a series loop and signal input means operable to switch the conductivity state of the "Esaki" diode.

2. The logical circuit of claim 1 wherein said magnetic element has an essentially square hysteresis loop.

3. The logical circuit of claim 2 wherein said signal input means comprises at least one inductive coupling into said series loop.

4. A circuit for performing logical operations comprising in combination an "Esaki" diode operable in one of two conductivity states, a magnetic element exhibiting hysteresis biased to saturation in a first remanent state and a current source connected in a series loop with sufficient impedance to establish operation of said "Esaki" diode at one point on the output characteristic thereof, and signal input means operable to introduce incremental current changes into said series loop sufficient to shift the operating point of said "Esaki" diode to another point on the output characteristic thereof whereby the magnetic element is switched to a second remanent state.

5. A logical circuit comprising a magnetic element exhibiting hysteresis, a source of current and an "Esaki" diode connected in a series loop containing impedance sufficient to establish operation of said "Esaki" diode at a high current point less than the peak current of the output characteristic thereof said high current establishing said magnetic element at a first predetermined hysteresis state, means coupled to said magnetic element capable of continuously biasing said magnetic element to a second predetermined hysteresis state and at least one signal means operable to produce a net incremental current change in said series loop at least sufficient to equal said peak current of said "Esaki" diode.

6. The circuit of claim 5 wherein said magnetic element exhibits an essentially square hysteresis property.

7. A logical circuit comprising a magnetic element exhibiting hysteresis, a series current loop magnetically coupled to said magnetic element comprising a current source and an "Esaki" diode containing impedance sufficient to establish operation of the "Esaki" diode therein at a particular current point on the operating characteristic thereof, means coupled to said magnetic element continuously biasing said magnetic element to a particular hysteresis state and at least one signal means coupled to said series loop operable to provide in response to signals applied thereto a net current change through the "Esaki" diode to change the hysteresis state of said magnetic element.

8. The logical circuit of claim 7 wherein said magnetic element exhibits an essentially square hysteresis property.

9. A logical circuit comprising a rectangular hysteresis loop magnetic core having two remanent stable states, a series current loop coupled to said core said loop including a current source and an "Esaki" diode connected in series with sufficient impedance to establish the operation current of each said "Esaki" diode at the same particular point on the output characteristic thereof adjacent to one of the critical points in said output characteristic, means biasing said magnetic element to a particular remanent hysteresis state and at least one signal means coupled to said series loop operable to provide in response to signals applied thereto a net current change in said series loop at least as great as the current required to move the operating point of said "Esaki" diode to said adjacent critical point on the output characteristic thereof.

10. The logical circuit of claim 9 wherein each said biasing means comprises a series current loop magnetically coupled to said core including a current source and an "Esaki" diode connected in series with sufficient impedance to establish operation of said "Esaki" diode at a point on the output characteristic thereof adjacent the other of said critical points on said output characteristic.

11. The logical circuit of claim 9 wherein the current in each said series loop in response to said signal means is sufficient to switch said magnetic element to the other of its remanent stable states.

12. The logical circuit of claim 9 wherein the net current flowing in response to any combination of input signals applied to said at least one series loop is sufficient to switch said magnetic element to the other of its remanent stable states.

13. A logical circuit comprising in combination a rectangular hysteresis loop magnetic element having a biasing winding and capable of two stable remanent states, a switching winding thereon, a biasing current source of a polarity and of sufficient magnitude to establish said magnetic element in a first stable remanent state, means connecting said first current source to said biasing winding, and for said switching winding a switching current loop including a switching current source, an "Esaki" diode operable in one of two conductivity states and at least one input transformer, means connecting said switching winding, said switching current source, said "Esaki" diode and said at least one input transformer in series relationship with a polarity and current magnitude sufficient at the "peak" current value of said "Esaki" diode to siwtch said magnetic element to the other of said table remanent states of said magnetic element.

14. The logical circuit of claim 13 including a biasing "Esaki" diode connected in a series loop with said biasing current source and said biasing winding including sufficient current to establish operation of said biasing "Esaki" diode in the vicinity of the "valley" current thereof.

15. A logical circuit as set forth in claim 13 including a readout winding magnetically coupled to said magnetic element wherein an output pulse is produced as the element is switched from one of its stable remanent states to the other stable remanent state.

References Cited in the file of this patent

UNITED STATES PATENTS

| | | |
|---|---|---|
| 2,653,254 | Spitzer et al. | Sept. 22, 1953 |
| 2,770,737 | Ramey | Nov. 13, 1956 |
| 2,808,578 | Goodell et al. | Oct. 1, 1957 |
| 2,909,674 | Moore et al. | Oct. 20, 1959 |